(12) United States Patent
Amato

(10) Patent No.: US 8,153,013 B2
(45) Date of Patent: Apr. 10, 2012

(54) FLUID PROCESSING APPARATUS

(75) Inventor: Tony Amato, Kidderminster (GB)

(73) Assignee: Sonico Limited, Kidderminster (GB)

( * ) Notice: Subject to any disclaimer, the term of this patent is extended or adjusted under 35 U.S.C. 154(b) by 1063 days.

(21) Appl. No.: 10/522,910

(22) PCT Filed: Aug. 1, 2003

(86) PCT No.: PCT/GB03/03370
§ 371 (c)(1), (2), (4) Date: Sep. 13, 2005

(87) PCT Pub. No.: WO2004/013052
PCT Pub. Date: Feb. 12, 2004

(65) Prior Publication Data
US 2006/0096931 A1    May 11, 2006

(30) Foreign Application Priority Data
Aug. 1, 2002   (GB) .................................. 0217913.3

(51) Int. Cl.
C02F 1/36 (2006.01)
(52) U.S. Cl. ................. 210/748.01; 422/20; 422/128
(58) Field of Classification Search .......... 210/748, 210/748.01, 748.02, 748.05; 422/20
See application file for complete search history.

(56) References Cited

U.S. PATENT DOCUMENTS 3,672,823 A * 6/1972 Boucher .................... 422/20
2004/0154991 A1* 8/2004 Clark ......................... 210/748

FOREIGN PATENT DOCUMENTS

| EP | 0 648 531 B1 | 4/1999 |
| GB | 2 350 106 A | 11/2000 |
| WO | WO 00/58224 | 10/2000 |

OTHER PUBLICATIONS

Dichtl, N. et al., *Desintegration von Klarschlamm—ein Aktueller Ueberblick* Korrespondenz Abwasser, Abwassertechnisch Vereinigung, St. Augustin, DE, Oct. 10, 1997, vol. 44, No. 10, pp. 1726-1739.
Neis, et al., "*Intensivierung Der Schlammfaulung Durch Klaerschlammaufschluss Mit Ultraschall*", Korrespondenz Abwasser, Abwassertechnisch Vereinigung, St. Augustin, DE, Oct. 1, 1997, vol. 44, No. 10, pp. 1850-1855.
PCT/GB 03/03370—International Search Report—Oct. 29, 2003.

* cited by examiner

*Primary Examiner* — Nam Nguyen
*Assistant Examiner* — Cameron J Allen
(74) *Attorney, Agent, or Firm* — Nixon Peabody LLP; Jeffrey L. Costellia

(57) ABSTRACT

The present invention relates to fluid processing apparatus for use in an elongate passage (10), the apparatus comprising a plurality of means for applying ultrasonic energy (12) to fluid within the passage positioned axially along the elongate passage, wherein axially adjacent means for applying ultrasonic energy are radially non-parallel and radially non-opposing.

32 Claims, 4 Drawing Sheets

FLUID PROCESSING APPARATUS

This invention is concerned with fluid processing devices, particularly but not exclusively for use in the treatment of sewage. The term "sewage" as used herein means domestic/municipal and industrial wastewaters and sludges.

The application of ultrasonic energy to sewage improves subsequent response of the sewage to treatment. For example, in the specification of European patent 0648531 there is described a fluid processing device comprising a chamber through which fluid to be processed may be fed, and an operating member having a circular cross-section in the chamber, the operating member comprising a plurality of surfaces including at least one interior circumferential surface, the device comprising means to cause said surfaces to vibrate at an ultrasonic frequency. In use, the fluid to be treated, is flowed through the chamber and over the circumferential surface, whereby ultrasonic energy is provided to the flowing fluid.

It has been now found that an advantageous fluid processing device, particularly for the treatment of raw sewage, comprises an elongate passage conveniently of circular cross-section through which fluid to be processed is fed, a plurality of axially spaced operating members in the passage, each operating member having an inner surface defining an inner passage through which fluid flowing through the device passes, and means to cause the inner surface of the operating members to vibrate at ultrasonic frequency generally radially of the operating member. In use, sewage flow through the elongate passage flows through the inner passages wherein it is subjected to ultrasonic energy derived from the vibrating inner surface of the operating members.

To allow access to the operating members, for example for maintenance purposes, access passages may be provided adjacent the elongate passage. However, such access passages must be of sufficient size to enable a person sufficient room to gain access to the operating members. For example, an access passage may typically have a substantially circular cross-section of approximately one metre diameter. Thus, such access passages can consume a considerable amount of space.

An approach to minimising the amount of space required for access passages is to substantially align the operating members along the elongate passage. However, such alignment of the operating members may prevent them from being positioned in sufficiently close axial proximity for optimum performance.

The present invention seeks to provide apparatus which can overcome the problems associated with the prior art discussed above.

According to the present invention there is provided a fluid processing apparatus for use in an elongate passage, the apparatus comprising a plurality of means for applying ultrasonic energy to fluid within the passage positioned axially along the elongate passage, wherein axially adjacent means for applying ultrasonic energy are radially non-parallel and radially non-opposing.

Thus, in the apparatus of the present invention, axially adjacent means for applying ultrasonic energy are radially displaced relative to each other at an angle between 0° and 180°. In this way, the means for applying ultrasonic energy may be positioned both axially and radially so as to provide optimum performance for processing fluid, whilst allowing for a reduction in the space required for access passages.

The precise angle of relative radial displacement between axially adjacent means for applying ultrasonic energy will be selected according to the particular circumstances in question, but will typically be between 0° and 90°, in particular 30° to 60°, for example substantially 45°.

The apparatus of the present invention comprises a plurality of means for applying ultrasonic energy. The more means for applying ultrasonic energy that are present, the larger the proportion of fluids which can be treated. Thus, the apparatus of the present invention may comprise two, three, four, five, six, seven, eight, nine, ten or more means for applying ultrasonic energy.

Preferably, there are provided at least four means for applying ultrasonic energy. In particular, five or more means for applying ultrasonic energy may be contained within the same elongate passage, enabling a highly efficacious treatment of the fluid to be obtained over a relatively compact distance.

In preferred embodiments of the present invention, alternate means for applying ultrasonic energy are radially aligned. Thus, for apparatus having five means for applying ultrasonic energy, the first, third and fifth means for applying ultrasonic energy may be radially aligned, as may the second and fourth. A particularly preferred embodiment of the present invention comprises five means for applying ultrasonic energy, in which the means for applying ultrasonic energy are radially symmetrically disposed either side of a line parallel with the longitudinal axis of the elongate passage. More preferably, the first, third and fifth means for applying ultrasonic energy are substantially in radial alignment disposed on one side of the line, and the second and fourth means for applying ultrasonic energy are substantially in radial alignment disposed by a substantially equal amount on the other side of the line. In this embodiment, the first, third and fifth, and second and fourth means for applying ultrasonic energy are preferably radially disposed by substantially 45°.

The means for applying ultrasonic energy may be axially spaced so as to provide optimum efficiency for treating fluids. The actual axial spacing will of course depend upon the individual means for applying ultrasonic energy in question, for example the size and power thereof. Adjacent means for applying ultrasonic energy will cooperate to produce an area of maximum ultrasonic energy substantially equidistant between the adjacent means for applying ultrasonic energy which apply energy at substantially equal power. For example, in an elongate passage having a diameter of approximately 150 mm, the optimum axial spacing of adjacent means for applying ultrasonic energy has been found be 50 mm or less, in particular between 30 and 40 mm.

Each means for applying ultrasonic energy may be activated independently. In this way, the amount of ultrasonic energy applied to a fluid within the elongate passage may be varied according to conditions. A particular fluid may require less processing by the apparatus of the present invention than another, which may not necessitate activation of all of the means for applying ultrasonic energy. It has been found that a reduction in power of a means for applying ultrasonic energy may occur when the or each immediately upstream adjacent means for applying ultrasonic energy are deactivated. For example, a reduction in power of a second downstream means for applying ultrasonic energy may occur if the axially adjacent first downstream means for applying ultrasonic energy is deactivated, compared to when said first means is activated.

Each means for applying ultrasonic energy preferably comprises an operating member connected to a vibration member, the operating member being connected to a source of ultrasonic energy. The means for applying ultrasonic energy preferably has an inner passage through which fluid flowing through the apparatus passes. Preferably an inner surface of the inner passage is arranged to vibrate radially.

Preferably, the longitudinal axis of the inner passage of each means for applying ultrasonic energy is substantially coincident with the longitudinal axis of the elongate passage. The elongate passage preferably has a circular cross-section, for example having a diameter of 150 mm.

An additional problem which has been found is that detritus contained in raw sewage, such as rags, paper, plastics etc., may accumulate in areas of low flow rate between the means for applying ultrasonic energy, (i.e. "dead" areas), which may eventually produce a reduction to the rate of flow of fluid through the apparatus, and possibly cause a blockage. This problem is exacerbated in a preferred fluid processing device, wherein to increase the amount of ultrasonic energy applied to the fluid, the fluid also flows over outer surfaces of the means for applying ultrasonic energy, particularly through generally annular passages between said outer surfaces and the interior surface defining the elongate passage.

Accordingly, the apparatus of the present invention may further comprise means for constraining or directing flow of fluid towards the longitudinal axis of the elongate passage.

By constraining or directing the fluid flow towards the longitudinal axis of the elongate passage or towards the inner passage, an increase in the flow rate of the fluid is produced. In the case of sewage, by this means a greater proportion of solids contained in the sewage will flow through the device on or more closely adjacent the longitudinal axis or directly through the inner passage and thus flow through areas of higher ultrasonic density than otherwise would be the case.

By so constraining the flow of fluid being treated towards the longitudinal axis of the elongate passage, it has been found that good flow characteristics of the fluid through a significantly larger number of sequential means for applying ultrasonic energy has been possible, than would otherwise have been the case.

Additionally, by increasing the fluid velocity, cavitation is produced which allows the creation of ultrasonic vibrations in those sections of the passage which are located between adjacent means for applying ultrasonic energy, increasing the efficiency of the device.

The increased velocity of flow along the passage can also ensure that a majority of detritus flows directly through the passage: any detritus which has flowed from the axis or the inner passage will be pulled by the venturi effect towards the longitudinal axis or inner passage. In this manner it has been found that tendency for detritus to accumulate in areas of low flow rate between adjacent operating members is reduced.

Additionally, reduction in the flow of fluid over the outer surfaces of the operating members by accumulation in the space between said outer surfaces and the walls defining the elongate passage is minimised by increasing the proportion of detritus which flows generally along the longitudinal axis directly through the device.

The means for constraining flow of fluid or the fluid directing means can be produced separately from the elongate passage and, therefore, can be mounted in existing elongate passages.

Preferably said means for constraining flow of fluid or the fluid directing means comprises a funnelling device through which fluid to be treated flows into the device. The funnelling device may be produced from a sheet of material which is not corrosive in the fluid, for example, stainless steel or plastics materials.

Conveniently, the funnelling device is operative to reduce the cross-sectional area through which fluid flows by at least a factor of 4. In preferred embodiments, the funnelling device is operative to reduce the cross-sectional area through which fluid flows by at least a factor of 8. Thus, where the elongate passage is of circular cross-section having a diameter of 150 mm, the funnelling device may reduce the cross-sectional area of the passage to approximately 50 mm diameter.

As referred to hereinabove, the elongate passage is preferably of circular cross-section. In this way, the passage therefore has no corners where detritus may build up.

Conveniently, the funnelling device is located within the elongate passage upstream of the means for applying ultrasonic energy. In this way, the fluid flow is constrained before it reaches the means for applying ultrasonic energy.

According to the present invention there is also provided a method of treating fluids, which method comprises placing the fluid processing apparatus according to the present invention into an elongate passage, and passing the fluid through the elongate passage.

Preferably the fluid is sewage sludge. The elongate passage through which the fluid passes may be aligned substantially horizontally, vertically, or at any suitable angle therebetween. However, vertically aligned elongate passages may require less space for fluid treatment than a substantially horizontally aligned elongate passage.

In preferred embodiments, the means for applying ultrasonic energy comprises an extender element for projecting an operating member into said elongate passage, said apparatus further comprising flushing means for flushing detritus from said extender element.

According to a further aspect of the present invention, there is provided processing apparatus for use in an elongate passage, the apparatus comprising a means for applying ultrasonic energy to fluid within the passage, said means for applying ultrasonic energy comprising an extender element for projecting an operating member into said elongate passage, said apparatus further comprising flushing means for flushing detritus from said extender element.

Preferably, said flushing means comprises one or more nozzles provided at or adjacent said extender element. Such one or more nozzles preferably propel liquid, for example water, towards the extender element. Detritus can thereby be washed off the extender element into the main flow in the elongate passage.

In preferred embodiments, the one or more nozzles are housed in a wall of a chamber through which the extender element projects.

Conveniently, the apparatus comprises a plurality of means for applying ultrasonic energy arranged with their operating members along a common longitudinal axis, adjacent extender elements being angularly offset with respect to one another. Such a plurality of means for applying ultrasonic energy are preferably arranged in a "V" formation. In preferred embodiments five such means for applying ultrasonic energy are provided within a single chamber, the chamber being provided with five nozzles.

The nozzles can incorporate actuated valves, which allow the extender elements and the chamber to be flushed separately or all at the same time.

The flushing operation may further be controlled automatically, in response to a draw in power from the means for applying ultrasonic energy. With suitable power draw measuring apparatus, a processor unit and actuation means, the flushing operation can be controlled to act selectively for a particular extender element in response to a power draw from a specific means for applying ultrasonic energy.

According to a yet further aspect of the present invention there is provided fluid processing apparatus for use in an elongate passage, the apparatus comprising a means for applying ultrasonic energy to fluid within the passage, said apparatus further comprising flushing means for flushing detritus from said apparatus, said flushing means comprising a flushing nozzle for directing flushing media towards an outer surface of a substantially conical surface provided within the passage. The flushing flow is directed onto the outer surface of the conical surface and caused to flow helically there around, thereby being subsequently directed in a substantially spiral configuration along the pipe. This flushing flow increases the general forward flow during the flushing cycle to encourage any displaced debris in the apparatus be pushed out.

Preferably, the outer conical surface is formed by an outer surface of a funnelling device provided in the passage and this may be the same funnelling device for constraining the flow discussed above. The funnelling device can thereby provide dual functions.

Examples of the present invention will now be described in detail with reference to the accompanying drawings, in which.

Figure 4:
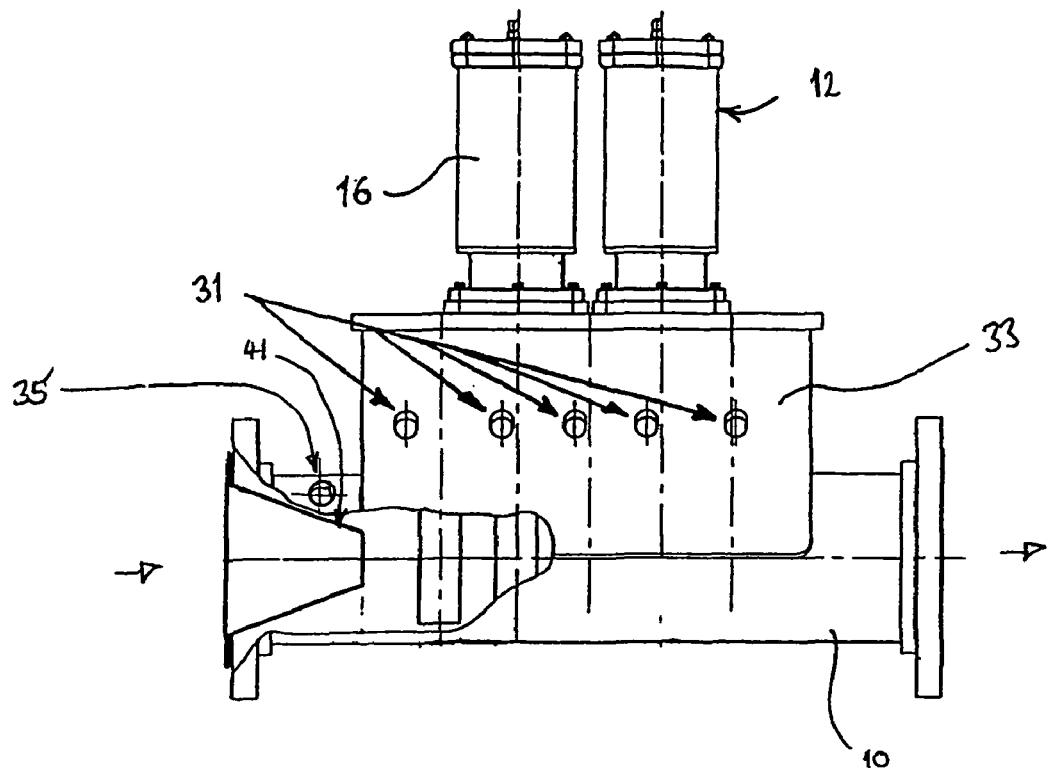
FIG. 4 is side view of a further embodiment of the present invention.
Figure 5:
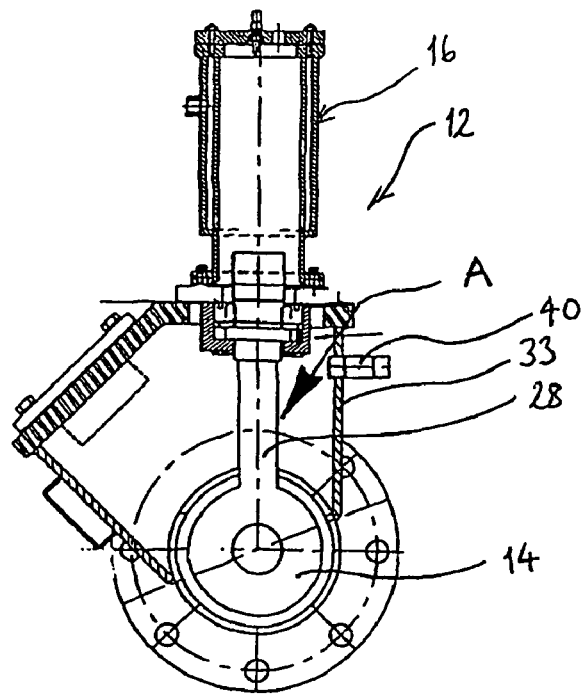

FIG. 5 us a cut-away end view of the embodiment shown in FIG. 4.

Referring to the Figures, the embodiments of the apparatus of the present invention are shown in relation to an elongate passage in the form of a pipe 10. The apparatus comprises five means for applying ultrasonic energy 12, each means for applying ultrasonic energy comprising an operating member 14, and an ultrasonic device 16 connected thereto. Each ultrasonic device 16 comprises a transducer 24, a booster encased within a seal clamp arrangement 26, and an extender 28.

Each operating member 14 is of substantially annular cross-section, comprising an outer surface 18, and an inner surface 20. Each ultrasonic device passes through the wall of the pipe 10.

In the present example, there are five operating devices 12 mounted on the pipe 10. However, any required number of operating devices can be present.

The inner surface 20 of each operating member defines an inner passage of circular cross-section through which fluid flowing through the apparatus passes, and additionally the annular space between the outer surface 18 of the operating member 14 and the inner wall 11 of the pipe 10 provides an outer passage 19 through which fluid may also flow.

The five means for applying ultrasonic energy 12 are arranged in two axially aligned groups, the first group comprising the first, third and fifth means for applying ultrasonic energy 12, and the second group comprising the second and fourth means for applying ultrasonic energy 12. Axially adjacent means for applying ultrasonic energy 12 are radially displaced relative to each other, the angle D shown in FIG. 2 being approximately 45°.

Figure 1:
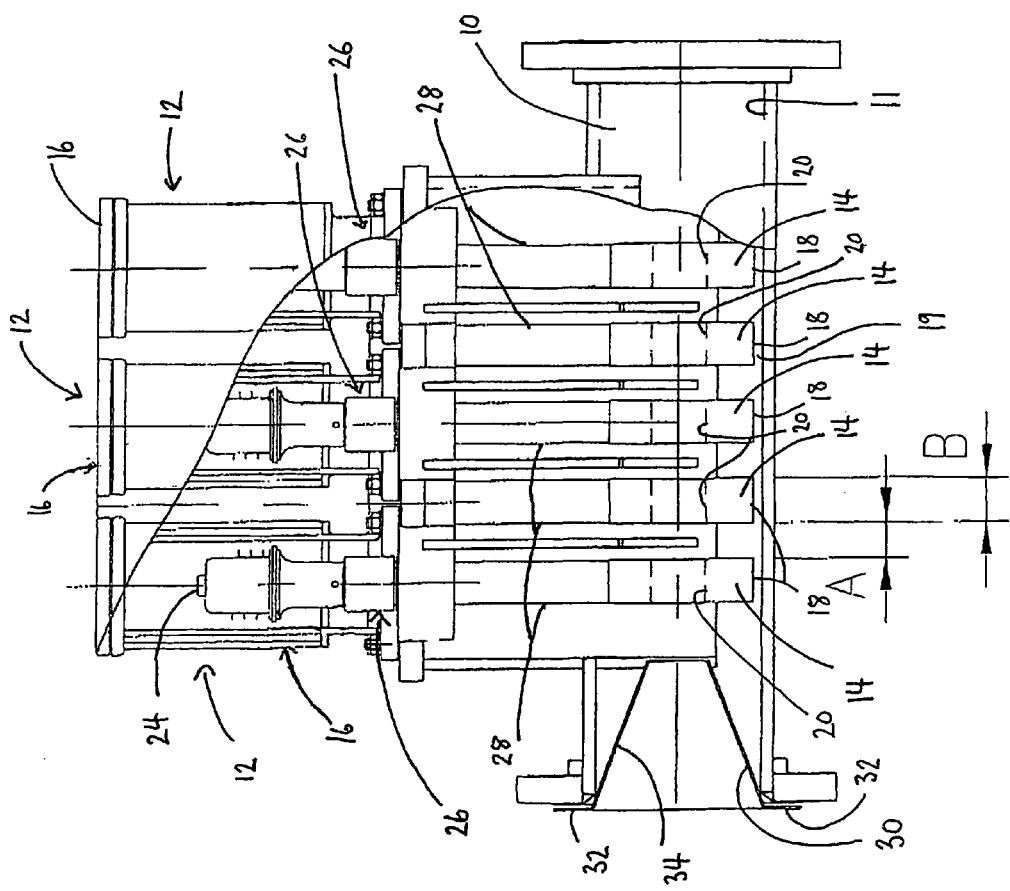
FIG. 1 is a partial cut-away side view of an embodiment of the apparatus of the present invention.
Figure 2:
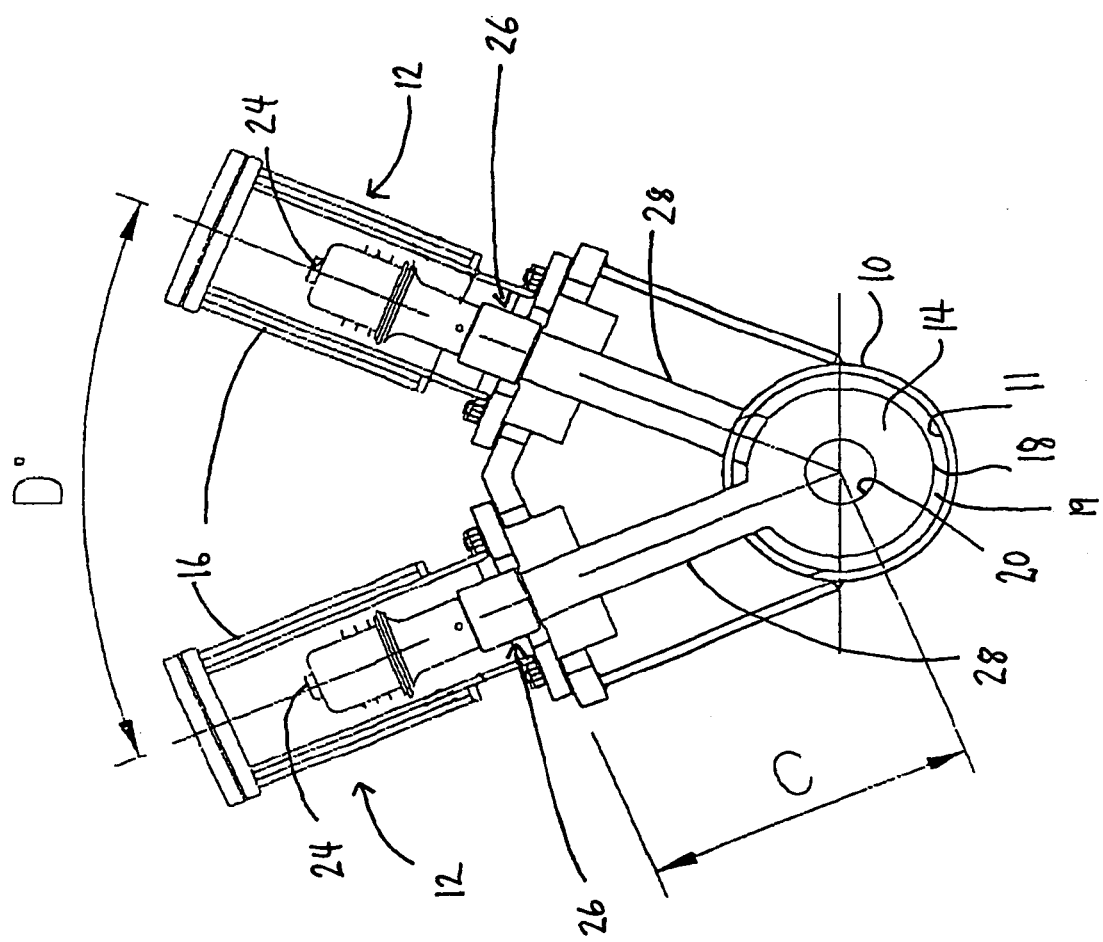
FIG. 2 is a cut-away end view of the embodiment shown in FIG. 1.
Figure 3:
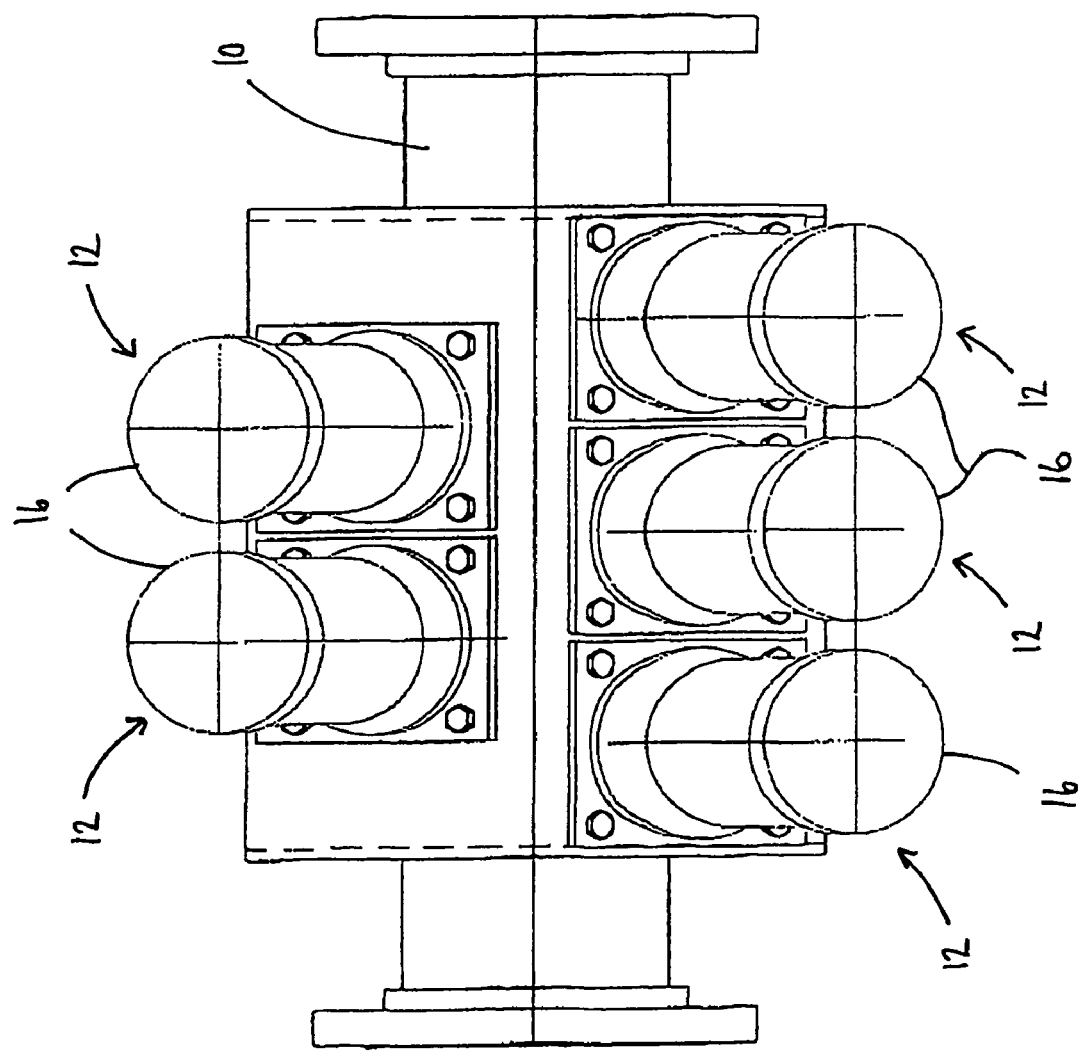
FIG. 3 is a top view of the embodiment shown in FIGS. 1 and 2.

In FIG. 1, the distance A is the distance between adjacent operating members 14, and in the embodiment shown is 30-40 mm. However, this distance may be varied to obtain optimum performance according to the particular conditions in question. Distance B shown in FIG. 1 is the depth of the operating members 14, and in the embodiment shown is approximately 40 mm. The depth of the operating member 14 chosen according to the particular ultrasonic characteristics required from the operating member, and is typically equal to or less than one third of the wavelength of sound in the material used to fabricate the operating member (e.g. titanium). Distance C in FIG. 2 is chosen such that each operating member 14 is positioned centrally within the pipe along the longitudinal axis thereof. In the embodiment shown, this distance is approximately 243 mm. This distance is typically one half of the wavelength of sound generated by the operating member 14, or a multiple thereof. Angle D in FIG. 2 is the angle by which axially adjacent means for applying ultrasonic energy are radially disposed, and in the embodiment shown is approximately 45°. However, as referred to above, this angle may be between 0° and 180°. In this way, the means for applying ultrasonic energy may be positioned both axially and radially so as to provide optimum performance for processing fluid, whilst allowing for a reduction in the space required for access passages.

In use, the ultrasonic devices 16 are each energised, causing longitudinal vibrations at ultrasonic frequency to be applied from the extender 28 to the operating member 14. Specifically, the operating member 14 has an internal radius R1 and an external radius R2, the relationship being such that $n(R1+R2)=K\lambda$, where K is an integer, and $\lambda$ is the wavelength of the vibrations applied by the ultrasonic device to the operating member 14. In this configuration the outer surface 18 and the inner surface 20 of the operating member alternatively radially expand and contract in a pulsating manner at ultrasonic frequency, apply ultrasonic energy to fluid flowing through the pipe 10.

Mounted in the upstream end of the pipe 10 is a funnelling device 30 which is a sliding fit in the end of the pipe 10, flanges 32 being provided to locate the funnelling device 30 in a desired location within the pipe. The funnelling device has a frusto-conical surface 34 which reduces the effective radius of pipe 10 typically from substantially 75 mm to substantially 25 mm, i.e. approximately equal to the radius R1, reducing the cross-sectional area of the flow passage through the device by a factor of 8 to 10.

In this manner, fluid fed through the apparatus is constrained towards the longitudinal axis of the apparatus, increasing the flow rate, and ensuring a greater proportion of solids are located on or close to the longitudinal axis. Additionally, the higher flow rate increases cavitation within the fluid flow, and, therefore, effective ultrasonic vibrations will occur in the sections of the elongate passage located between adjacent operating members. Further, since the fluid is flowing at a higher velocity through the apparatus than would otherwise be the case, the majority of detritus flows directly through the internal flow passage defined by the interior surfaces 20 of operating members 14. In this way the flow of detritus into the relatively "dead" spaces between adjacent operating members 14 is reduced, reducing the tendency of such detritus to clog the outer passage 19.

Further, such detritus as may flow from the longitudinal axis will tend to be pulled back into the main flow stream by the venturi effect of the relatively high speed flow of the fluid through the device.

In this way, it has been found that a high density of ultrasonic devices may be utilised, applying a large amount of ultrasonic energy to the fluid flow through the apparatus over a relatively short longitudinal distance, with significantly reduced tendency for blockage to occur.

Table 1 below shows results regarding the frequency and power of ultrasonic energy generated from the first to fifth means for applying ultrasonic energy of the embodiment of the present invention shown in the Figures, when different combinations of from zero to four means for applying ultrasonic energy are switched off. The power figures are the percentage of installed power applied, and the frequency values stated are thousands of Hertz.

TABLE 1

| Means for applying ultrasonic energy | | | | | | | | | |
|---|---|---|---|---|---|---|---|---|---|
| One | | Two | | Three | | Four | | Five | |
| Power | Frequency | Power | Frequency | Power | Frequency | Power | Frequency | Power | Frequency |
| 44 | 20.190 | 45 | 20.151 | 55 | 20.206 | 56 | 20.224 | 78 | 20.219 |
| OFF | OFF | 36 | 20.137 | 55 | 20.204 | 54 | 20.225 | 78 | 20.220 |
| 40 | 20.190 | OFF | OFF | 56 | 20.206 | 53 | 20.224 | 78 | 20.218 |
| 40 | 20.189 | 45 | 20.161 | OFF | OFF | 54 | 20.225 | 78 | 20.223 |
| 40 | 20.192 | 44 | 20.152 | 55 | 20.206 | OFF | OFF | 78 | 20.225 |
| 43 | 20.191 | 45 | 20.152 | 56 | 20.206 | 55 | 20.226 | OFF | OFF |
| OFF | OFF | OFF | OFF | 46 | 20.205 | 54 | 20.225 | 78 | 20.223 |
| OFF | OFF | 38 | 20.145 | OFF | OFF | 55 | 20.225 | 75 | 20.222 |
| OFF | OFF | 37 | 20.136 | 53 | 20.204 | OFF | OFF | 79 | 20.224 |
| OFF | OFF | 36 | 20.137 | 54 | 20.207 | 53 | 20.225 | OFF | OFF |
| 39 | 20.190 | OFF | OFF | OFF | OFF | 54 | 20.223 | 76 | 20.222 |
| 40 | 20.193 | OFF | OFF | 55 | 20.205 | OFF | OFF | 79 | 20.223 |
| 39 | 20.190 | OFF | OFF | 56 | 20.206 | 52 | 20.223 | OFF | OFF |
| 39 | 20.189 | 45 | 20.168 | OFF | OFF | OFF | OFF | 78 | 20.223 |
| 40 | 20.189 | 44 | 20.163 | OFF | OFF | 53 | 20.225 | OFF | OFF |
| 40 | 20.191 | 43 | 20.156 | 56 | 20.205 | OFF | OFF | OFF | OFF |
| OFF | OFF | OFF | OFF | OFF | OFF | 45 | 20.224 | 71 | 20.221 |
| OFF | OFF | OFF | OFF | 45 | 20.206 | OFF | OFF | 74 | 20.223 |
| OFF | OFF | 37 | 20.146 | OFF | OFF | OFF | OFF | 77 | 20.224 |
| OFF | OFF | 35 | 20.138 | OFF | OFF | 51 | 20.223 | OFF | OFF |
| OFF | OFF | 35 | 20.136 | 53 | 20.204 | OFF | OFF | OFF | OFF |
| 39 | 20.189 | OFF | OFF | OFF | OFF | OFF | OFF | 76 | 20.224 |
| 41 | 20.190 | OFF | OFF | OFF | OFF | 52 | 20.224 | OFF | OFF |
| 40 | 20.190 | 45 | 20.167 | OFF | OFF | OFF | OFF | OFF | OFF |
| OFF | OFF | OFF | OFF | OFF | OFF | OFF | OFF | 64 | 20.197 |

As discussed above and as can be seen from Table 1 it has been found that a reduction in power of a means for applying ultrasonic energy may occur when the or each immediately upstream adjacent means for applying ultrasonic energy are deactivated. For example, the power output of the second means for applying ultrasonic energy drops from 45% to 36% when the first means for applying ultrasonic energy is deactivated.

It is to be appreciated that whilst this invention has been devised specifically for the treatment of raw sewage, the invention may be utilised in the treatment of other fluids, where similar or analogous problems arise, and in particular where it is desired to apply ultrasonic energy to the fluid in an efficient manner.

It will be understood that the embodiments illustrated show applications of the invention only for the purposes of illustration. In practice the invention may be applied to many different configurations, the detailed embodiments being straightforward for those skilled in the art to implement.

The means for applying ultrasonic energy may or may not have an inner passage. The funnelling device can be integral with the pipe.

The funnelling device may be formed such that there is provided an inner passage with a frusto-conical surface.

There may be any suitable number of ultrasonic devices in the elongate passage, for example, 4, 5, 6, 7, 8, 9, 15, 20.

FIGS. 4 and 5 show a further embodiment where the apparatus additionally includes a flushing arrangement. As before, the apparatus comprises five means for applying ultrasonic energy 12 (only two of the five are shown in FIG. 4). Each means for applying ultrasonic energy comprises an operating member 14, and an ultrasonic device 16 connected thereto. An extender 28 couples the ultrasonic device to the operating member.

The apparatus further comprises nozzles 40 provided in inlets 31 in chamber 33. These nozzles are connected to a supply of clean water (or an alternative cleaning media) and when required propel water at the extenders 28.

In this regard it has become apparent to the applicant that miscellaneous detritus, e.g. fibres, fats and grease, can find their way into the chamber 33 and accumulate around the extender 28 in the area indicated by "A" in FIG. 5. As a result there is a noticeable and undesirable draw on power such that over a period of time the apparatus has to be drained down and the accumulated detritus manually removed.

The nozzles 40 provide a flushing capability to allow flushing of any accumulated detritus back into the main flow within the elongate passage. The nozzles can incorporate actuated valves, which allow the extenders and the chamber to be flushed separately or all at the same time.

The flushing operation may further be controlled automatically, in response to a draw in power from the means for applying ultrasonic energy. In this regard, fluid may be supplied to the nozzles should the power draw exceed a certain threshold value.

With suitable power draw measuring apparatus, a processor unit and actuation means, the flushing operation can be controlled to act selectively in response to a power draw from a specific means for applying ultrasonic energy.

A further inlet 35 is provided in the pipe 10 upstream of the means for applying ultrasonic energy. An associated nozzle (not shown) provided in the inlet 35 directs flushing flow into the space between an upper outer surface 41 of the funnelling device 30 and the inner surface of the pipe 10.

In this connection, flushing flow introduced at inlet 35 is directed onto the outer surface of the funnelling device and caused to flow helically there around, thereby being subsequently directed in a substantially spiral configuration along the pipe 10.

This flushing flow from inlet 35 increases the general forward flow during the flushing cycle to encourage any displaced debris from chamber 33 to be pushed out of the apparatus.

The flow from inlet 35 may be arranged to be active whether the other nozzles 40 within chamber 33 are used separately or together.

The invention claimed is:

1. Fluid processing apparatus for use in an elongate passage, the apparatus comprising a plurality of operating devices for applying ultrasonic energy to fluid within the passage,
wherein said operating devices are provided at different axial positions along the elongate passage and wherein all axially adjacent operating devices have non-parallel and non-opposing vertical planes, each vertical plane containing the elongate axis of the elongate passage and the respective operating device.

2. Apparatus according to claim 1, which comprises five or more operating devices contained within the same elongate passage.

3. Apparatus according to claim 1, wherein alternate operating devices are radially aligned.

4. Apparatus according to claim 1, which comprises five operating devices, in which the operating devices are radially symmetrically disposed either side of a line parallel with the longitudinal axis of the elongate passage.

5. Apparatus according to claim 4, wherein the first, third and fifth operating devices are substantially in radial alignment disposed on one side of the line, and the second and fourth operating devices are substantially in radial alignment disposed by a substantially equal amount on the other side of the line.

6. Apparatus according to claim 1, wherein axially adjacent operating devices are axially spaced by an amount from 30 to 40 mm.

7. Apparatus according to claim 1, wherein each operating device may be activated independently.

8. Apparatus according to claim 1, wherein each operating device preferably comprises an operating member connected to a vibration member, the operating member being connected to a source of ultrasonic energy.

9. Apparatus according to claim 8, wherein the operating devices have an inner passage through which fluid flowing through the apparatus passes.

10. Apparatus according to claim 9, wherein an inner surface of the inner passage is arranged to vibrate radially.

11. Apparatus according to claim 9, wherein the longitudinal axis of the inner passage of each operating device is substantially coincident with the longitudinal axis of the elongate passage.

12. Apparatus according to claim 1, which further comprises means for constraining flow of fluid towards the longitudinal axis of the elongate passage.

13. Apparatus according to claim 12, wherein said means for constraining flow of fluid comprises a funnelling device.

14. Apparatus according to claim 13, wherein said funnelling device is operative to reduce the cross-sectional area through which fluid flows by at least a factor of 4.

15. Apparatus according to claim 14, wherein said funnelling device is operative to reduce the cross-sectional area through which fluid flows by at least a factor of 8.

16. Apparatus according to claim 13, wherein the funnelling device is located within the elongate passage upstream of the operating devices.

17. Apparatus according to claim 1, wherein each operating device comprises a vibration member having an inner passage.

18. Apparatus according to claim 1, wherein each operating device comprises an extender element for projecting an operating member into said elongate passage, said apparatus further comprising flushing means for flushing detritus from said extender elements.

19. Apparatus according to claim 18, wherein the apparatus further comprises a plurality of operating devices arranged with their operating members along a common longitudinal axis, adjacent extender elements being angularly offset with respect to one another.

20. Apparatus according to claim 19, wherein the plurality of operating devices are arranged in a "V" formation.

21. Apparatus according to claim 1, wherein axially adjacent operating devices are radially displaced relative to each other by an angle between 0° and 180°.

22. Apparatus according to claim 21, wherein the angle is from 0° to 90°.

23. Apparatus according to claim 22, wherein the angle is from 30° to 60°.

24. Apparatus according to claim 23, wherein the angle is substantially 45°.

25. Fluid processing apparatus for use in an elongate passage, the apparatus comprising an operating device for applying ultrasonic energy to fluid within the passage, said operating device comprising an extender element for projecting an operating member into said elongate passage, said apparatus further comprising flushing means for directing cleaning media at said extender element for flushing detritus from the extender element back into the fluid flow within the passage.

26. Apparatus according to claim 25, wherein said flushing means comprises one or more nozzles provided at or adjacent said extender element.

27. Apparatus according to claim 26, wherein the one or more nozzles are housed in a wall of a chamber through which the extender element projects.

28. Apparatus according to claim 26, wherein the nozzles incorporate actuated valves.

29. Apparatus according to claim 25, wherein supply of fluid to the nozzles is controlled automatically, in response to a draw in power from the operating devices.

30. A method of treating fluids comprising placing a fluid processing apparatus into an elongate passage, and passing the fluid through the elongate passage;
wherein said fluid processing apparatus includes a plurality of operating devices for applying ultrasonic energy to fluid within the passage provided at different axial positions along the elongate passage, axially adjacent operating devices having non-parallel and non-opposing vertical planes, each vertical plane containing the elongate axis of the elongate passage and the respective operating device.

31. A method according to claim 30, wherein the elongate passage is aligned substantially vertically.

32. Fluid processing apparatus for use in an elongate passage, the apparatus comprising an operating device for applying ultrasonic energy to fluid within the passage, said apparatus further comprising flushing means for flushing detritus from said apparatus, said flushing means comprising a flushing nozzle for directing flushing media towards an outer surface of a substantially conical surface formed by an outer surface of a funnelling device provided in the passage.

* * * * *